US012744170B2

(12) United States Patent
Fujihara et al.

(10) Patent No.: US 12,744,170 B2
(45) Date of Patent: Sep. 22, 2026

(54) TRIGGER SWITCH

(71) Applicant: OMRON Corporation, Kyoto (JP)

(72) Inventors: Takumi Fujihara, Kyoto (JP); Kazushi Maeta, Kyoto (JP); Yohei Tsukanaka, Kyoto (JP); Taiki Koyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 281 days.

(21) Appl. No.: 18/582,683

(22) Filed: Feb. 21, 2024

(65) Prior Publication Data

US 2024/0297004 A1 Sep. 5, 2024

(30) Foreign Application Priority Data

Mar. 3, 2023 (JP) ................................ 2023-032552

(51) Int. Cl.
*H01H 13/14* (2006.01)
*H01H 13/52* (2006.01)

(52) U.S. Cl.
CPC ............ *H01H 13/14* (2013.01); *H01H 13/52* (2013.01); *H01H 2221/032* (2013.01); *H01H 2221/044* (2013.01); *H01H 2231/048* (2013.01)

(58) Field of Classification Search
CPC .. H01H 3/00; H01H 3/04; H01H 3/06; H01H 2215/028; H01H 2219/002; H01H 2300/06; H01H 2300/062; H01H 2300/066; H01H 2013/00; H01H 2013/02; H01H 2013/50; H01H 2013/52; H01H 2013/566; H01H 2221/00; H01H 2221/032; H01H 2221/044; H01H 2231/00; H01H 2231/048; H01H 13/00; H01H 13/02; H01H 13/04; H01H 13/14; H01H 13/20; H01H 13/26; H01H 13/50; H01H 13/52; H01H 13/70; H01H 2001/50; H01H 2003/12
(Continued)

(56) References Cited

U.S. PATENT DOCUMENTS 8,124,898 B2 * 2/2012 Mathew ............... H01H 23/025
200/18

FOREIGN PATENT DOCUMENTS

CN 108269710 7/2018
JP 2011183523 9/2011
(Continued)

OTHER PUBLICATIONS

"Notice of Non-Final Rejection of Korea Counterpart Application", issued on Feb. 15, 2025, with English translation thereof, pp. 1-9.

*Primary Examiner* — Anthony R Jimenez
(74) *Attorney, Agent, or Firm* — JCIPRNET

(57) ABSTRACT

Provided is a trigger switch that is incorporated into an electric device such as a power tool and drives a drive part such as a drive motor of the electric device, and is capable of adjusting the force required to press a trigger. A trigger switch TS includes a trigger 1 that moves from a release position in a pulling direction in response to a pulling operation, and a return spring 5 that urges the trigger 1 in a direction opposite to the pulling direction. The return spring 5 included in the trigger switch TS is pressed in the pulling direction by the movement of the trigger 1 and increases the urging force in accordance with the force of pressing. The trigger switch TS includes an adjustment member 6 that adjusts the urging force of the return spring 5 at the release position of the trigger 1.

3 Claims, 7 Drawing Sheets

(58) Field of Classification Search
USPC .......................................................... 200/341
See application file for complete search history.

(56) References Cited

FOREIGN PATENT DOCUMENTS

| | | | | |
|---|---|---|---|---|
| JP | 2015219965 | | 12/2015 | |
| TW | I711063 B | * | 11/2020 | ............. H01H 13/14 |

* cited by examiner

TRIGGER SWITCH

CROSS-REFERENCE TO RELATED APPLICATION

This application claims the priority benefits of Japanese application no. 2023-032552, filed on Mar. 3, 2023. The entirety of the above-mentioned patent application is hereby incorporated by reference herein and made a part of this specification.

BACKGROUND

Technical Field

The disclosure relates to a trigger switch including a trigger that moves from a release position in a pulling direction in response to a pulling operation.

Description of Related Art

Trigger switches that accept pulling operations are used in power tools such as electric screwdrivers. A trigger switch used to control a power tool includes a trigger that moves from a release position in a pulling direction in response to a pulling operation, and a return spring that urges the trigger in a direction opposite to the pulling direction (see Patent Document 1 (Japanese Patent Application Laid-Open No. 2015-219965)).

However, for the conventional trigger switch as disclosed in Patent Document 1, the force required for the pulling operation is fixed. Thus, for example, if the grip strength of the user is weak, the burden on the user may be heavy. Furthermore, if the force required for the pulling operation is too weak relative to the grip strength of the user, an unintended pulling operation may occur.

The disclosure provides a trigger switch that is capable of varying the force required for a pulling operation.

SUMMARY

A trigger switch according to an embodiment of the disclosure includes a trigger that moves from a release position in a pulling direction in response to a pulling operation; a return spring that urges the trigger in a direction opposite to the pulling direction, and is pressed in the pulling direction by movement of the trigger and increases an urging force in accordance with a force of pressing; and an adjustment member that adjusts the urging force of the return spring at the release position of the trigger.

Further, in the trigger switch according to an embodiment of the disclosure, the adjustment member is configured to move in conjunction with the movement of the trigger, includes an abutting part that abuts the return spring, and is capable of adjusting the urging force by adjusting a position of the abutting part at the release position of the trigger.

Further, the trigger switch according to an embodiment of the disclosure includes a shaft member that supports the trigger on one end side, and the shaft member includes a holding part that holds the adjustment member, and moves in conjunction with the movement of the trigger and presses the return spring via the abutting part of the adjustment member being held.

Further, in the trigger switch according to an embodiment of the disclosure, the shaft member has a hollow cylindrical shape, and houses all or part of the adjustment member inside, and the holding part is an internal thread that movably holds the position of the abutting part of the adjustment member.

Further, in the trigger switch according to an embodiment of the disclosure, the trigger is attachable and detachable, and in a case where the trigger is removed, the urging force of the adjustment member is adjustable by a jig that operates the adjustment member.

The trigger switch according to an embodiment of the disclosure includes the adjustment member that adjusts the urging force of the return spring. By making the urging force of the return spring adjustable, excellent effects are achieved, such as making it possible to vary the force required for the pulling operation of the trigger.

DESCRIPTION OF THE EMBODIMENTS

Embodiments of the disclosure will be described hereinafter with reference to the drawings.

Application Example

The trigger switch according to an embodiment of the disclosure is suitable as the switches of various electric devices including power tools such as electric drills, electric screwdrivers, electric wrenches, and electric grinders. In the following embodiment, a trigger switch TS incorporated in such a power tool PT will be exemplified and described with reference to the drawings.

Structure Example

Figure 1:
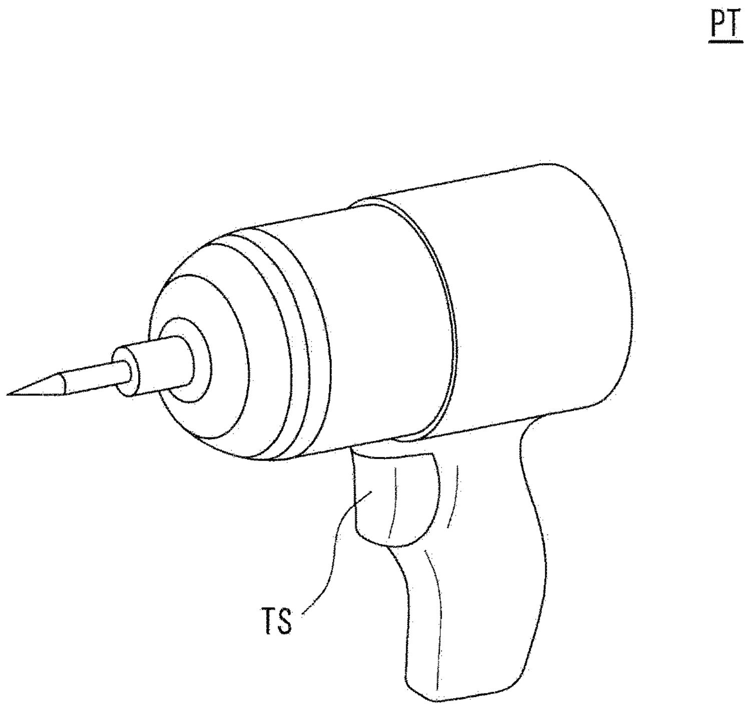
FIG. 1 is a schematic perspective view showing an example of the appearance of a power tool incorporating the trigger switch according to an embodiment of the disclosure.

FIG. 1 is a schematic perspective view showing an example of the appearance of the power tool PT incorporating the trigger switch TS according to an embodiment of the disclosure. The trigger switch TS according to an embodiment of the disclosure is incorporated into the power tool PT such as an electric drill, an electric screwdriver, an electric wrench, and an electric grinder to be used. The trigger switch TS is a switch operated by the user of the power tool PT. FIG. 1 exemplifies a released state in which the user is not operating the trigger switch TS. When the user performs a pulling operation on the trigger switch TS from the released state illustrated in FIG. 1, a drive part (not shown) such as an electric motor built in the power tool PT is driven.

Figure 2:
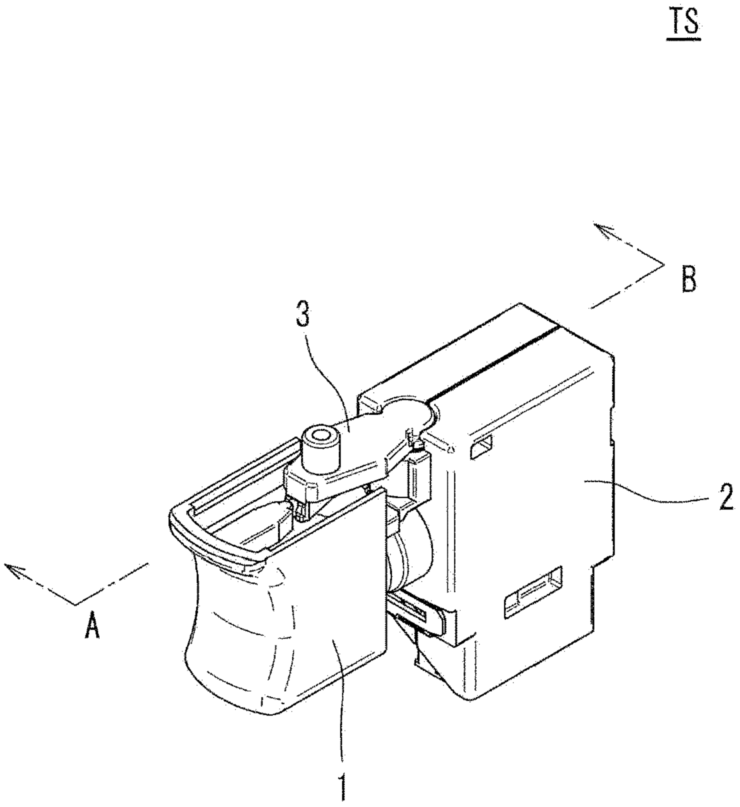
FIG. 2 is a schematic perspective view showing an example of the appearance of the trigger switch according to an embodiment of the disclosure.

FIG. 2 is a schematic perspective view showing an example of the appearance of the trigger switch TS according to an embodiment of the disclosure. The trigger switch TS includes a trigger 1 that accepts a pulling operation, a housing 2 that has a substantially rectangular parallelepiped shape, and a switching lever 3 that accepts a switching operation. In the following description, the directions of the trigger switch TS are expressed as follows: the direction in which the trigger 1 is arranged with respect to the housing 2 is referred to as front, the opposite side is referred to as rear, the direction in which the switching lever 3 is arranged with respect to the housing 2 is referred to as up, the opposite side is referred to as down, the left side facing forward is referred to as left, and the right side is referred to as right, but these directions are defined for convenience of explanation and do not limit the direction in which the trigger switch TS is used.

The trigger 1 is a member for placing a finger when the user performs a pulling operation. When the user places a finger on the trigger 1 and pulls the trigger 1 rearward, the trigger 1 moves toward the side of the housing 2 at the rear and a pulling operation is performed.

The trigger 1 is arranged on the front side of the housing 2, and the switching lever 3 is arranged on the upper side of the housing 2. Inside the housing 2, various members as described below are housed.

The switching lever 3 is a member that swings left and right in response to an operation of switching the drive direction of the drive part from the user. Further, when the switching lever 3 is operated to be located in the middle of the swing range, the switching lever 3 functions as a stopper that prevents the trigger 1 from being pulled.

Figure 3:
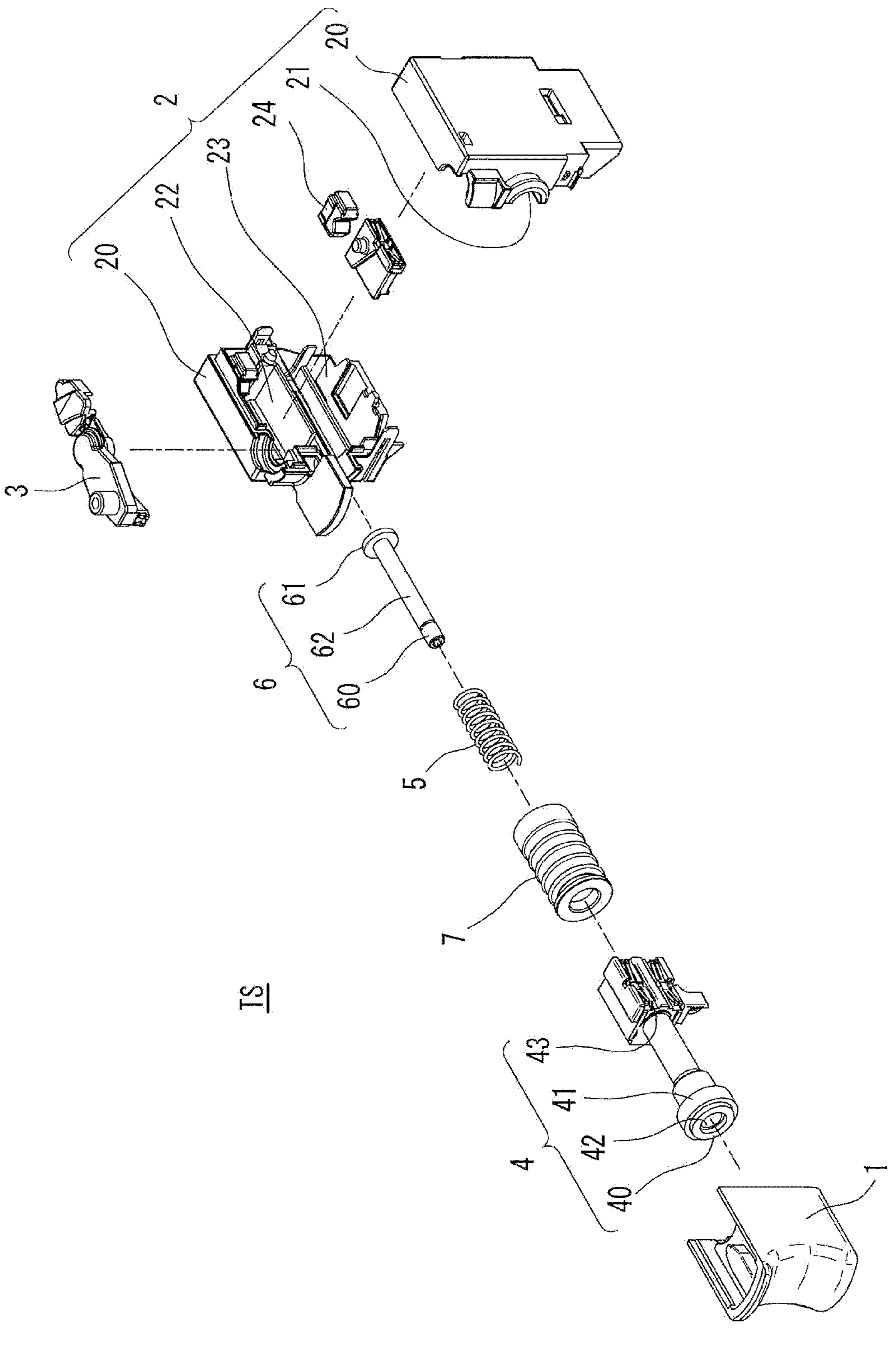
FIG. 3 is a schematic exploded perspective view showing an example of the trigger switch according to an embodiment of the disclosure.
Figure 4:
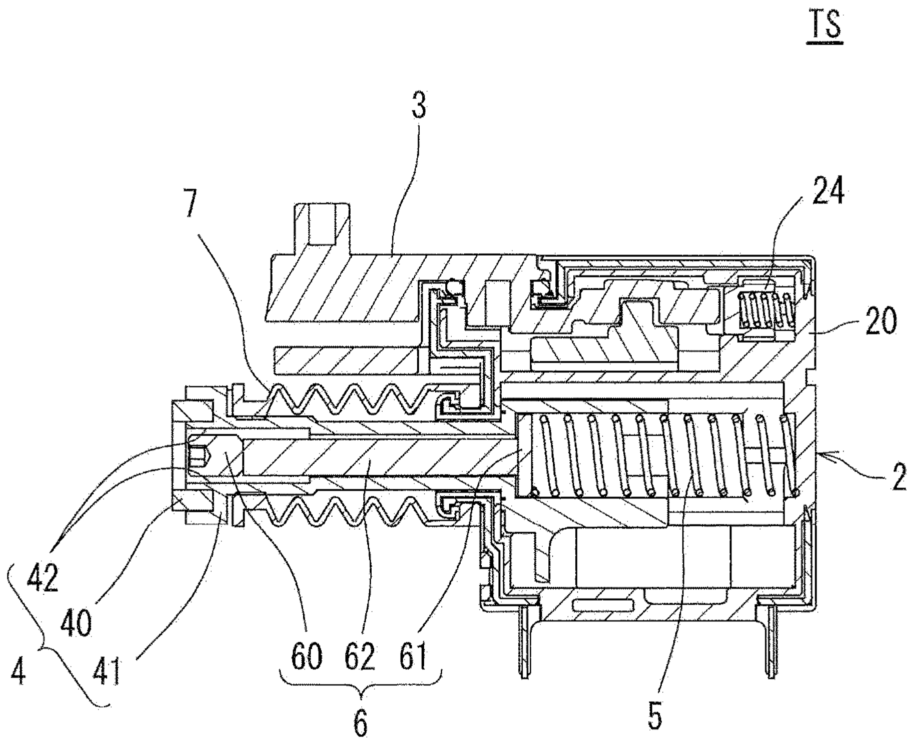
FIG. 4 is a schematic cross-sectional view showing an example of the trigger switch according to an embodiment of the disclosure.

FIG. 3 is a schematic exploded perspective view showing an example of the trigger switch TS according to an embodiment of the disclosure. FIG. 4 is a schematic cross-sectional view showing an example of the trigger switch TS according to an embodiment of the disclosure. FIG. 4 shows a cross section taken along the line A-B shown in FIG. 2 from a viewpoint in the direction of the arrow, with the trigger 1 removed from the trigger switch TS.

The trigger switch TS includes various other members such as a shaft member 4, a return spring 5, an adjustment member 6, and a covering member 7 in addition to the trigger 1, the housing 2, and the switching lever 3.

The trigger 1 is a member that accepts a pulling operation of the user, and the front surface of the trigger 1 has a curved shape for the user to easily place a finger thereon during operation. The front end of the shaft member 4 is fitted into the trigger 1. A magnet (not shown) that attracts the front end (one end side) of the shaft member 4 is incorporated inside the trigger 1, and the trigger 1 is attached to the shaft member 4 by the magnetic force. The trigger 1 is attachable to and detachable from the front end of the shaft member 4.

The housing 2 is a hollow case having a substantially rectangular parallelepiped shape, and can be divided into left and right halves 20. A substrate and a circuit (not shown) formed on the substrate are arranged on the inner surface of the left half 20 (the left inner surface that is the inside of the housing 2). A substantially circular through hole 21 is provided on the front surface of the housing 2, and the shaft member 4 passes through the through hole 21. The peripheral edge of the through hole 21 protrudes forward in a cylindrical shape. The switching lever 3 is attached to the upper surface of the housing 2. The inside of the housing 2 is divided into an upper chamber 22 and a lower chamber 23 in two stages, upper and lower. A switching mechanism 24 is housed in the upper chamber 22 within the housing 2. The lower chamber 23 within the housing 2 houses the rear portion of the shaft member 4, the rear portion of the adjustment member 6, and the return spring 5. The switching mechanism 24 is configured using a plurality of parts that engage with the switching lever 3, and operates as the switching lever 3 swings. That is, when the switching lever 3 swings from side to side in response to a switching operation, the switching mechanism 24 operates and the operation direction of the drive part is switched.

The shaft member 4 is a plunger having a substantially elongated cylindrical shape at the front and a substantially rectangular cylindrical shape at the rear, and is arranged to be movable back and forth so as to pass through the through hole 21 of the housing 2. The shaft member 4 supports the trigger 1 on the front end side. The front end of the shaft member 4 is an attachment part 40 using a magnet, and when the trigger 1 is attached, the front end is attracted to the magnet (not shown) inside the trigger 1 by the magnetic force. The outer periphery of the front portion of the shaft member 4 is a flange part 41 that protrudes outward. All or part of the elongated rod-shaped adjustment member 6 is housed inside the hollow and substantially cylindrical shaft member 4. Although FIG. 4 illustrates a configuration in which the entire adjustment member 6 is housed inside the shaft member 4, the rear portion of the adjustment member 6 may be exposed from the shaft member 4. An internal thread is carved on the inside of the front portion of the shaft member 4 as a holding part 42 that holds the adjustment member 6 to be movable back and forth, and is screwed onto an external thread formed on the outer periphery of the adjustment member 6. The shaft member 4 holds the adjustment member 6 to be movable back and forth by being screwed onto the adjustment member 6. The rear portion of the shaft member 4 is housed within the housing 2 and is movable back and forth within the housing 2. Part of the return spring 5 at the front is housed in the space inside the shaft member 4 whose rear portion is formed into a substantially rectangular cylindrical shape. A contact part 43 made of a conductive metal piece is formed on the left side of the rear portion of the shaft member 4 which is formed in a substantially rectangular cylindrical shape. The contact part 43 abuts the circuit formed on the left inner surface of the housing 2.

The shaft member 4 that supports the trigger 1 on the front end side moves rearward (in the pulling direction) in conjunction with the movement of the trigger 1 that receives the pulling operation, and presses the return spring 5 via the held adjustment member 6. When the trigger 1 is released from the pulling operation, the shaft member 4 moves forward due to the urging force of the return spring 5. As the shaft member 4 moves back and forth, the contact part 43 opens and closes the circuit formed on the substrate to control the operation of the drive part. The contact part 43 moves back and forth as the shaft member 4 moves, and slides while abutting the circuit. When the contact part 43 moves rearward, the circuit closes and the drive part operates, and when the contact part 43 returns to the front, the circuit opens and the drive part stops. It should be noted that the drive part may also be set to a variable speed mode in which the drive speed changes according to the amount of movement of the contact part 43.

The return spring 5 is formed using a spring such as a compression coil spring. The front side of the return spring 5 is inserted into the shaft member 4 so that the return spring 5 abuts the adjustment member 6 housed inside the shaft member 4 at the front end and is in contact with the rear inner wall of the housing 2 at the rear end. The return spring 5 whose rear end is fixed to the inner wall of the housing 2 urges the trigger 1 forward (in the direction opposite to the pulling direction) via the adjustment member 6 and the shaft member 4 at the front end. The return spring 5 is compressed and strengthens the urging force as the trigger 1 moves rearward upon receiving the pulling operation.

The adjustment member 6 is housed within the shaft member 4 and has a function of adjusting the urging force of the return spring 5 at the release position of the trigger 1. The adjustment member 6 has an elongated rod shape as a whole, and is configured using a front screw part 60 that uses a set screw, a rear abutting part 61 that abuts the return spring 5 as a spring seat, and a connecting shaft 62 that connects the screw part 60 and the abutting part 61. The front end of the screw part 60 that constitutes the adjustment member 6 is formed in the shape of a hexagonal hole, slot, or the like for engaging a jig such as a hexagonal wrench, a Phillips screwdriver, or a flathead screwdriver. An external thread is formed on the outer periphery of the screw part 60 that constitutes the adjustment member 6, and is screwed into the internal thread carved inside the shaft member 4. The abutting part 61 constituting the adjustment member 6 abuts the front end of the return spring 5 at the rear end.

The covering member 7 is formed in a substantially cylindrical bellows shape, and covers the shaft member 4 in the circumferential direction on the outside of the housing 2. The front end of the covering member 7 abuts the flange part 41 formed on the outer periphery of the front portion of the shaft member 4. The rear end of the covering member 7 is attached so as to cover the protruding portion of the peripheral edge of the through hole 21 opened on the front surface of the housing 2. The covering member 7 is a packing formed using a flexible and airtight material such as rubber, and expands and contracts in the axial direction and seals the inside.

Operation Example

Figure 5:
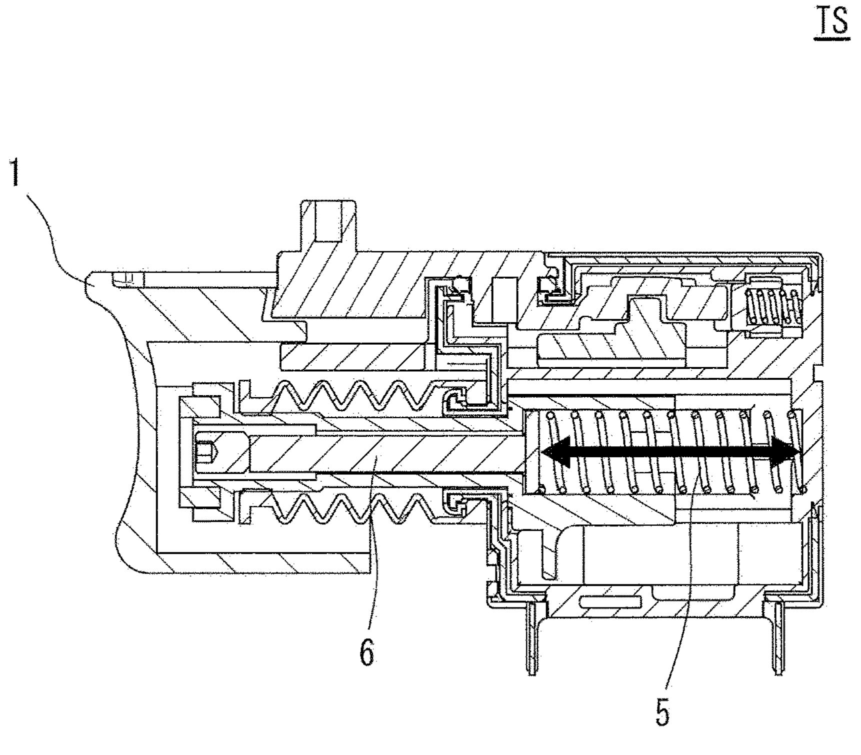
FIG. 5 is a schematic cross-sectional view showing an example of the trigger switch according to an embodiment of the disclosure in a state before load adjustment.
Figure 6:
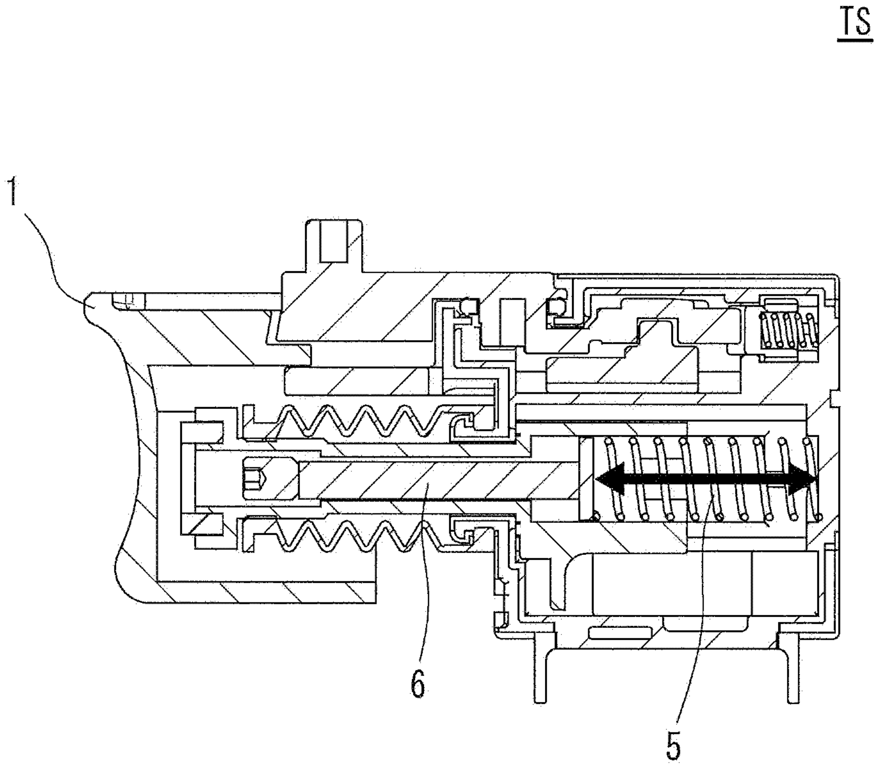
FIG. 6 is a schematic cross-sectional view showing an example of the trigger switch according to an embodiment of the disclosure in a state after load adjustment.

Next, the operation of the trigger switch TS according to an embodiment of the disclosure will be described. FIG. 5 is a schematic cross-sectional view showing an example of the trigger switch TS according to an embodiment of the disclosure in a state before load adjustment. FIG. 6 is a schematic cross-sectional view showing an example of the trigger switch TS according to an embodiment of the disclosure in a state after load adjustment. In the trigger switch TS before load adjustment illustrated in FIG. 5, the adjustment member 6 is located at the front end of the movement range. In the trigger switch TS after load adjustment illustrated in FIG. 6, the adjustment member 6 has moved rearward compared to FIG. 5. The return spring 5 is compressed by the movement of the adjustment member 6 from FIG. 5 to FIG. 6, and the length of the return spring 5 in the front-rear direction (expanding/contracting direction) indicated by the black double-headed arrow in the drawing is adjusted to be short. As the return spring 5 is compressed and shortened in the expanding/contracting direction, the urging force that urges the trigger 1 forward increases. That is, the trigger switch TS according to an embodiment of the disclosure is capable of adjusting the urging force of the return spring 5 at the release position of the trigger 1 through movement of the adjustment member 6.

Figure 7:
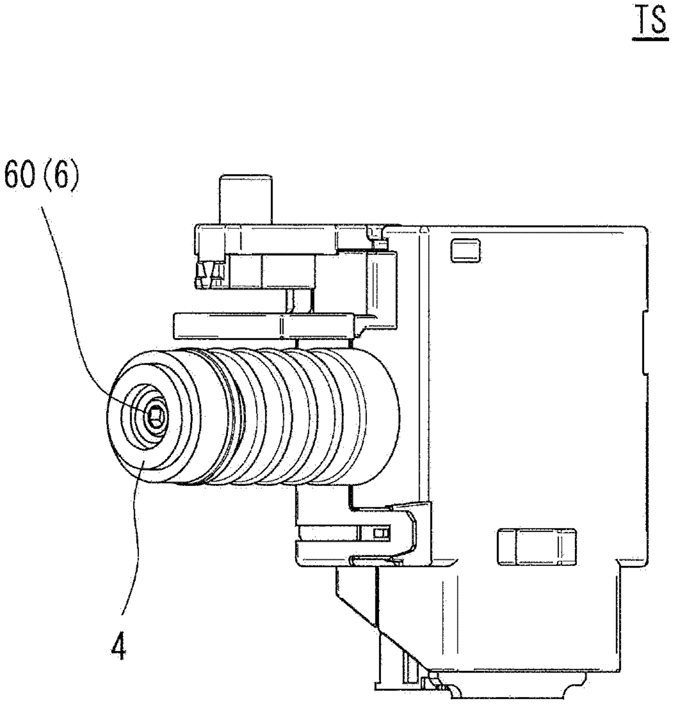
FIG. 7 is a schematic perspective view showing an example of the appearance of the trigger switch according to an embodiment of the disclosure.

FIG. 7 is a schematic perspective view showing an example of the appearance of the trigger switch TS according to an embodiment of the disclosure. FIG. 7 illustrates a state in which the user removes the trigger 1 from the trigger switch TS and adjusts the position of the adjustment member 6. By removing the trigger 1 which is magnetically attached to the trigger switch TS, the opening at the front end of the substantially cylindrical shaft member 4 is exposed. When adjusting the load of the trigger switch TS, the user inserts a jig such as a hexagonal wrench, a Phillips screwdriver, a flathead screwdriver, or the like through the opening at the front end of the shaft member 4, and rotates the screw part 60 constituting the adjustment member 6 in the circumferential direction. As the screw part 60 of the adjustment member 6 rotates, the adjustment member 6 moves forward or rearward, thereby adjusting the urging force of the return spring 5. In addition, since the adjustment member 6 is screwed into the shaft member 4 at the screw part 60, the adjustment member 6 is not moved by the urging force of the return spring 5, for example, unless the user moves the adjustment member 6.

Figure 8:
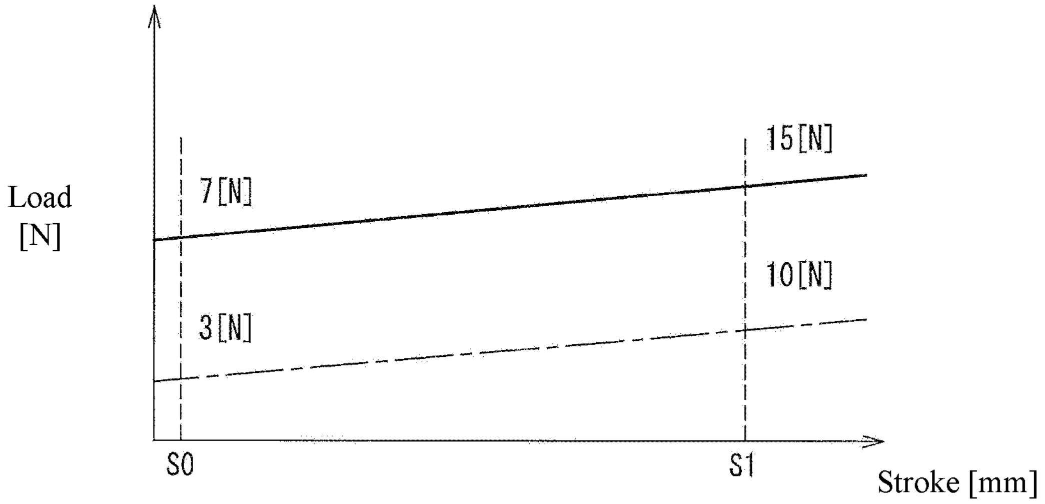
FIG. 8 is a graph showing the load due to the urging force of the return spring against the trigger in the trigger switch according to an embodiment of the disclosure.

FIG. 8 is a graph showing the load due to the urging force of the return spring 5 against the trigger 1 in the trigger switch TS according to an embodiment of the disclosure. FIG. 8 shows the relationship between the stroke, which indicates the length of the pull-in of the trigger 1, on the horizontal axis, and the load due to the urging force of the return spring 5, on the vertical axis. The position of S0 of the stroke indicates the release position of the trigger 1, and the position of S1 indicates the position where the trigger 1 is pulled in to the end. In the relationship between stroke and load, the one-dot chain line indicates the state before load adjustment, and the solid line indicates the state after load adjustment. In the example of FIG. 8, before load adjustment, the load required to start pulling is 3N, and the load in the pulling state is 10N. Further, after load adjustment, the load at the time of starting pulling is 7N, and the load in the pulling state is 15N. As illustrated in FIG. 8, the load due to the urging force of the return spring 5 is increased by adjusting the load. The magnitude of the load indicates the strength required for the pulling operation. Moreover, regardless of whether the load is adjusted, the load due to the urging force is increased by pulling the trigger 1.

Figure 9:
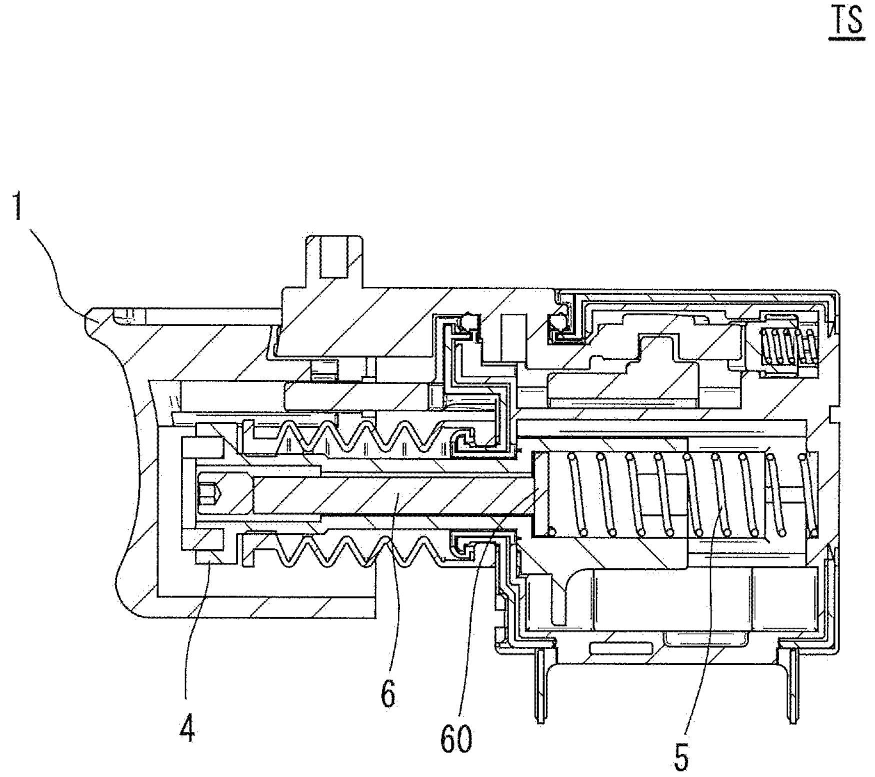
FIG. 9 is a schematic cross-sectional view showing an example of the trigger switch according to an embodiment of the disclosure in a state before load adjustment.
Figure 10:
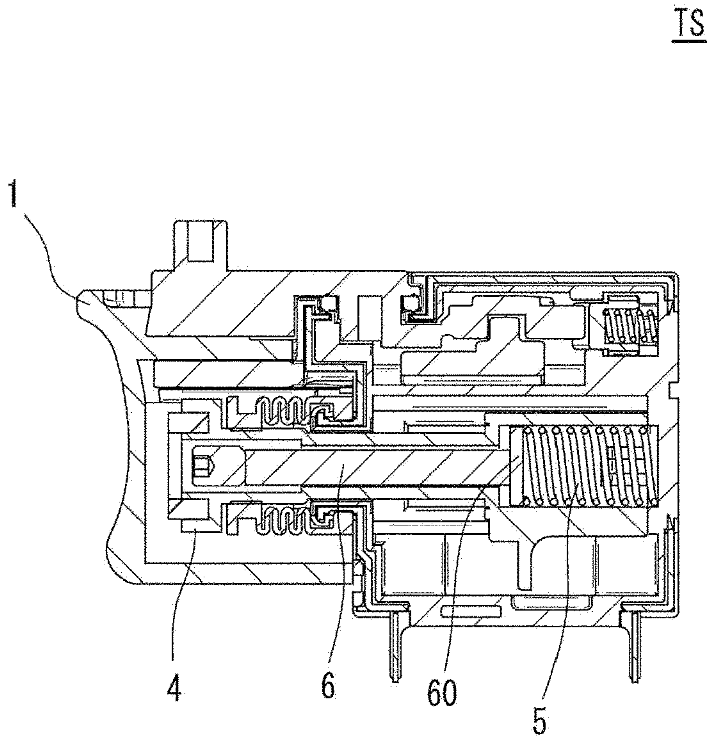
FIG. 10 is a schematic cross-sectional view showing an example of the trigger switch according to an embodiment of the disclosure in a state before load adjustment.

FIG. 9 and FIG. 10 are schematic cross-sectional views showing an example of the trigger switch TS according to an embodiment of the disclosure in a state before load adjustment. The trigger switch TS illustrated in FIG. 9 shows a state at the release position where the trigger 1 is not pulled, and the trigger switch TS illustrated in FIG. 10 shows a state in which the trigger 1 receives a pulling operation. From the state illustrated in FIG. 9, the trigger 1 moves from the release position in the pulling direction in response to a pulling operation of the user. As the trigger 1 moves in the pulling direction, the shaft member 4 and the adjustment member 6 move in the movement direction. As the adjustment member 6 moves, the return spring 5 is compressed by receiving pressure in the pressing direction from the abutting part 61 of the adjustment member 6, resulting in the state illustrated in FIG. 10. Further, as the shaft member 4 moves, the contact part 43 moves, and the drive part is driven. When the operator releases the trigger 1, the adjustment member 6 is pressed in the direction opposite to the pressing direction by the urging force of the return spring 5, and the trigger 1, the shaft member 4, and the adjustment member 6 return to the release position illustrated in FIG. 9.

Figure 11:
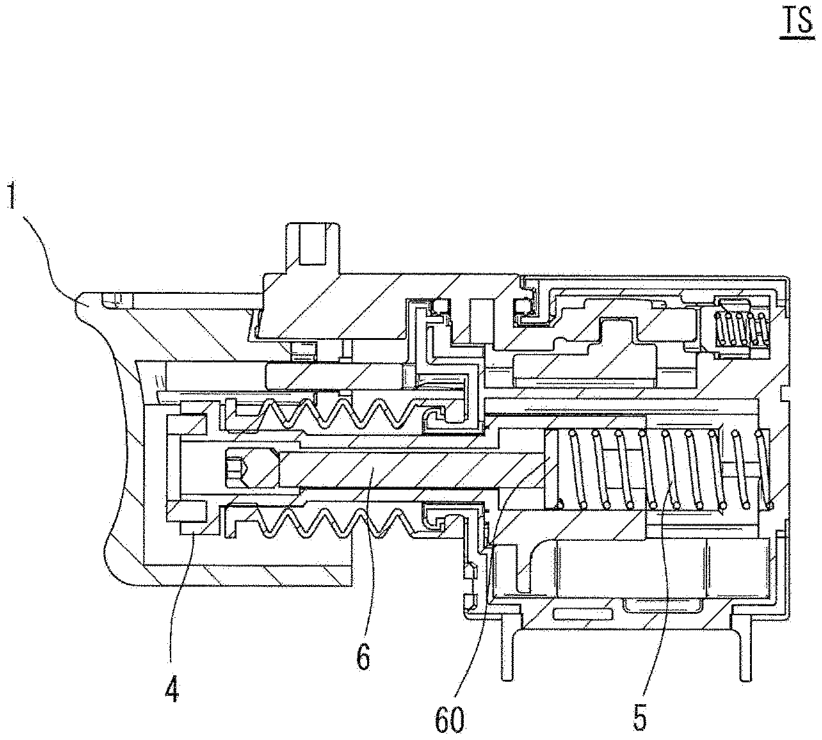
FIG. 11 is a schematic cross-sectional view showing an example of the trigger switch according to an embodiment of the disclosure in a state after load adjustment.
Figure 12:
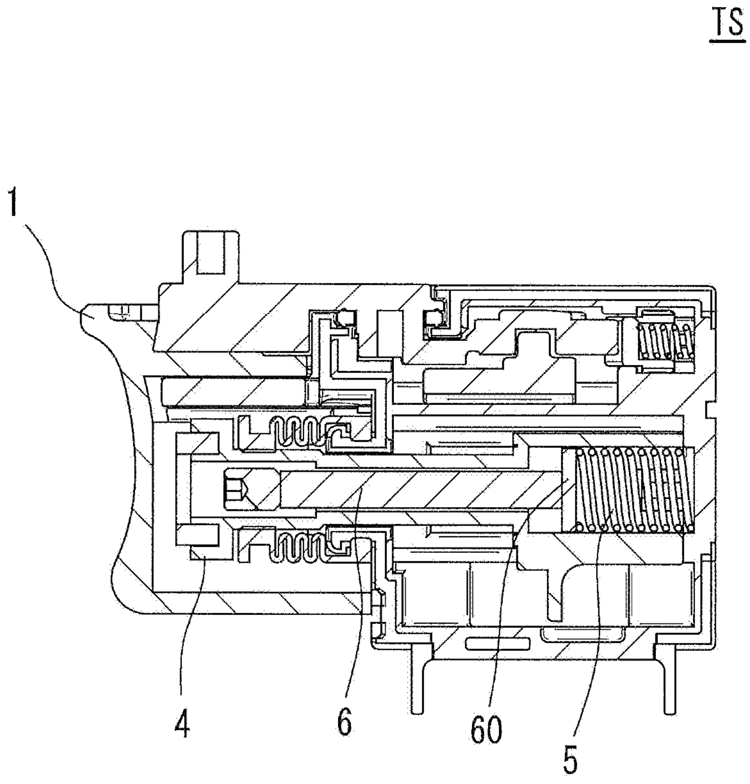
FIG. 12 is a schematic cross-sectional view showing an example of the trigger switch according to an embodiment of the disclosure in a state after load adjustment.

FIG. 11 and FIG. 12 are schematic cross-sectional views showing an example of the trigger switch TS according to an embodiment of the disclosure in a state after load adjustment. The trigger switch TS illustrated in FIG. 11 shows a state at the release position, and the trigger switch TS illustrated in FIG. 12 shows a state in which the trigger 1 receives a pulling operation. Since the trigger switch TS illustrated in FIG. 11 and FIG. 12 has the load adjusted, compared to the state illustrated in FIG. 9 and FIG. 10, the adjustment member 6 moves rearward, resulting in a shortened state in which the return spring 5 is pressed. The operations of the trigger 1, the shaft member 4, the adjustment member 6, and the drive part due to the pulling operation are the same as before the load adjustment, but the return spring 5 is in a further pressed state. Therefore, as shown in the graph of FIG. 8, the trigger switch TS after load adjustment requires a larger pressing force than the trigger switch TS before load adjustment from the start of pressing the trigger 1 to fully pressing the trigger 1.

The trigger switch TS of the disclosure configured as described above includes the adjustment member 6 for adjusting the urging force of the return spring 5. By moving the position of the adjustment member 6, the user is allowed to expand and contract the return spring 5 in the longitudinal direction and adjust the urging force of the return spring 5. Therefore, the trigger switch TS according to an embodiment of the disclosure achieves excellent effects such as varying the force required to pull the trigger 1.

The disclosure is not limited to the embodiments described above, and may be implemented in various other forms. Therefore, the embodiments described above are merely illustrative in every respect, and should not be interpreted in a limiting manner. The technical scope of the disclosure is defined by the claims, and is not restricted in any way by the main text of the specification. Furthermore, all modifications and changes that come within the scope of equivalents of the claims are intended to be within the scope of the disclosure.

For example, although the above embodiment illustrates that the trigger 1 is removed and the position of the adjustment member 6 is adjusted from the front, the trigger switch TS of the disclosure is not limited thereto, and may be developed into various forms such as providing an opening at the rear or on a side for inserting a jig for adjustment. Furthermore, the trigger switch TS of the disclosure may be developed into various forms such as providing an operation part, e.g. a lever, on the power tool PT and operating the operation part to adjust the position of the adjustment member 6 without using a jig.

Further, although the above embodiment illustrates that a compression coil spring is used as the return spring 5, the trigger switch TS of the disclosure is not limited thereto, and may be developed into various forms such as using other members as the return spring 5, e.g. a plate spring whose urging force is adjustable by moving the position.

Additional Note 1

A trigger switch, including:

a trigger that moves from a release position in a pulling direction in response to a pulling operation;

a return spring that urges the trigger in a direction opposite to the pulling direction, wherein the return spring is pressed in the pulling direction by movement of the trigger and increases an urging force in accordance with a force of pressing; and an adjustment member that adjusts the urging force of the return spring at the release position of the trigger.

Additional Note 2

The trigger switch according to additional note 1, wherein the adjustment member is configured to move in conjunction with the movement of the trigger, includes an abutting part that abuts the return spring, and is capable of adjusting the urging force by adjusting a position of the abutting part at the release position of the trigger.

Additional Note 3

The trigger switch according to additional note 1, including a shaft member that supports the trigger on one end side, wherein the shaft member includes a holding part that holds the adjustment member, and moves in conjunction with the movement of the trigger and presses the return spring via the abutting part of the adjustment member being held.

Additional Note 4

The trigger switch according to additional note 3, wherein the shaft member has a hollow cylindrical shape, and houses all or part of the adjustment member inside, and the holding part is an internal thread that movably holds the position of the abutting part of the adjustment member.

Additional Note 5

The trigger switch according to any one of additional notes 1 to 4, wherein the trigger is attachable and detachable, and in a case where the trigger is removed, the urging force of the adjustment member is adjustable by a jig that operates the adjustment member.

What is claimed is:

1. A trigger switch, comprising:

a trigger that moves from a release position in a pulling direction in response to a pulling operation;

a shaft member that supports the trigger on one end side;

a return spring that urges the trigger in a direction opposite to the pulling direction, wherein the return spring is pressed in the pulling direction by movement of the trigger and increases an urging force in accordance with a force of pressing; and an adjustment member that adjusts the urging force of the return spring at the release position of the trigger, wherein the adjustment member is configured to move in conjunction with the movement of the trigger, comprises an abutting part that abuts the return spring, and is capable of adjusting the urging force by adjusting a position of the abutting part at the release position of the trigger, wherein the shaft member comprises a holding part that holds the adjustment member, and moves in conjunction with the movement of the trigger and presses the return spring via the abutting part of the adjustment member being held.

2. The trigger switch according to claim 1, wherein the shaft member has a hollow cylindrical shape, and houses all or part of the adjustment member inside, and the holding part is an internal thread that movably holds the position of the abutting part of the adjustment member.

3. The trigger switch according to claim 1, wherein the trigger is attachable to and detachable from the shaft member, and in a case where the trigger is removed, the urging force of the adjustment member is adjustable by a jig that operates the adjustment member.

* * * * *